United States Patent
Sugden et al.

(10) Patent No.: US 7,237,374 B2
(45) Date of Patent: Jul. 3, 2007

(54) ROLLER ASSEMBLY FOR STRIPING A LAWN

(75) Inventors: David J. Sugden, Horicon, WI (US); Kevin A. Boeck, Van Dyne, WI (US); Christopher L. Frame, Burnett, WI (US)

(73) Assignee: Scag Power Equipment, Inc., Mayville, WI (US)

( * ) Notice: Subject to any disclaimer, the term of this patent is extended or adjusted under 35 U.S.C. 154(b) by 0 days.

(21) Appl. No.: 10/672,713

(22) Filed: Sep. 26, 2003

(65) Prior Publication Data

US 2005/0066642 A1 Mar. 31, 2005

(51) Int. Cl.
*A01D 34/53* (2006.01)

(52) U.S. Cl. ....................................... 56/249
(58) Field of Classification Search ................. 56/17.4, 56/17.2, 249, 244, 255, 16.7
See application file for complete search history.

(56) References Cited

U.S. PATENT DOCUMENTS

| | | | | |
|---|---|---|---|---|
| 261,638 | A | * | 7/1882 | Stanly ......................... 404/128 |
| 1,399,601 | A | * | 12/1921 | Boll ............................. 56/249 |
| 2,032,784 | A | | 3/1936 | Worthington |
| 2,253,924 | A | | 8/1941 | Worthington |
| 2,260,801 | A | | 10/1941 | Clemson |
| 2,476,526 | A | | 7/1949 | Badlal |
| 2,520,488 | A | | 8/1950 | Batchelder |
| 2,613,756 | A | | 10/1952 | Smith |
| 2,629,222 | A | | 2/1953 | Johnston |
| 2,660,018 | A | | 11/1953 | Clemson |
| 2,667,026 | A | * | 1/1954 | Ingram ......................... 56/249 |
| 2,973,613 | A | | 3/1961 | Hagedorn |
| 3,106,812 | A | * | 10/1963 | McDonagh ................. 56/320.1 |
| 3,118,268 | A | | 1/1964 | Benz |
| 3,176,454 | A | | 4/1965 | Jepson et al. |
| 3,178,874 | A | * | 4/1965 | Hanson et al. ................. 56/254 |
| 3,190,061 | A | | 6/1965 | Gilbertson |
| 3,226,920 | A | | 1/1966 | Gilbertson |
| 3,260,042 | A | | 7/1966 | Hanson et al. |
| 3,378,995 | A | | 4/1968 | Welsh |
| 3,402,535 | A | | 9/1968 | Nelson |
| 3,555,793 | A | | 1/1971 | Chapman |
| 3,706,186 | A | * | 12/1972 | Hurlburt et al. .............. 56/15.8 |
| 3,727,386 | A | | 4/1973 | Jespersen et al. |
| 3,754,385 | A | | 8/1973 | Hoffmeyer |
| 3,755,998 | A | | 9/1973 | Hoffmeyer |
| 3,903,969 | A | * | 9/1975 | Bellussi .......................... 172/5 |
| 4,021,996 | A | * | 5/1977 | Bartlett et al. .................... 56/7 |
| 4,044,534 | A | * | 8/1977 | Day et al. ..................... 56/13.3 |
| 4,144,698 | A | | 3/1979 | Shelton |

(Continued)

*Primary Examiner*—Árpád Fábián Kovács
(74) *Attorney, Agent, or Firm*—Boyle Fredrickson Newholm Stein & Gratz S.C.

(57) ABSTRACT

An roller assembly for attachment to a lawnmower. The roller assembly generally includes a tow arm having first and second links. The first link is configured to be supported at least indirectly on the lawnmower frame. The second link is connected to a shaft mounted with one or more rollers. A spring is disposed between the first and second links and configured to bias the second link downwardly relative to the first link, thereby biasing the rollers against a ground surface. The roller assembly further includes a quick connect assembly for rapid attachment and detachment of the roller assembly to the lawnmower. The roller assembly yet further includes latch assembly configured to hold the second link and shaft of rollers in a raised position relative to the ground surface.

8 Claims, 7 Drawing Sheets

U.S. PATENT DOCUMENTS

| | | |
|---|---|---|
| 4,208,151 A | 6/1980 | Cross |
| 4,322,938 A | 4/1982 | Efflandt |
| 4,455,816 A | 6/1984 | Porath |
| 4,481,757 A | 11/1984 | Tsuchiya |
| 4,638,622 A | 1/1987 | Smith |
| 4,796,322 A | 1/1989 | Steed et al. |
| 4,878,340 A | 11/1989 | Roy et al. |
| 4,899,828 A * | 2/1990 | Harris .................... 172/21 |
| 4,903,465 A | 2/1990 | Hughes |
| 4,989,676 A | 2/1991 | Rogers |
| 4,999,984 A | 3/1991 | Pelietier |
| 5,027,592 A | 7/1991 | Wieneke |
| 5,197,267 A | 3/1993 | Aldred et al. |
| 5,228,277 A | 7/1993 | Smith et al. |
| 5,261,213 A | 11/1993 | Humphrey |
| 5,394,681 A | 3/1995 | Nolan et al. |
| 5,533,326 A | 7/1996 | Goman et al. |
| 5,553,380 A | 9/1996 | Rice |
| 5,586,604 A * | 12/1996 | Postema .................... 172/21 |
| 5,634,325 A | 6/1997 | Thorman et al. |
| 5,761,894 A | 6/1998 | Evans |
| D395,900 S * | 7/1998 | Shannon et al. ............. D15/28 |
| 5,822,960 A | 10/1998 | Kitamura et al. |
| 5,865,016 A | 2/1999 | Toman |
| 5,870,888 A * | 2/1999 | Pugh .................... 56/16.7 |
| 6,047,530 A | 4/2000 | Bednar |
| 6,082,082 A | 7/2000 | Hunter et al. |
| 6,253,534 B1 | 7/2001 | Hunter et al. |
| 6,336,311 B1 | 1/2002 | Bednar |
| 6,336,312 B1 | 1/2002 | Bednar et al. |
| 6,484,481 B1 | 11/2002 | Langworthy et al. |
| 6,523,335 B2 | 2/2003 | Vanderipe |
| 6,523,336 B2 | 2/2003 | Starr |
| 6,732,500 B1 * | 5/2004 | Myers .................... 56/17.2 |
| 2002/0095922 A1 | 7/2002 | Goman et al. |
| 2003/0061792 A1 | 4/2003 | Fillman et al. |

* cited by examiner

ROLLER ASSEMBLY FOR STRIPING A LAWN

BACKGROUND OF THE INVENTION

1. Field of the Invention

The invention relates to a roller assembly and, more particularly, relates to a roller assembly towed by a lawnmower for striping a grass lawn.

2. Discussion of the Related Art

Roller assemblies are generally known in the grooming of lawns. In particular, roller assemblies are typically used in areas such as golf courses and baseball stadiums to create the aesthetic striped appearance on the grass. The roller assemblies generally tow behind lawnmowers and bend the freshly cut grass to create the desired striped appearance across the lawn.

However, known roller assemblies have several drawbacks. For instance, typical roller assemblies are directly attached to the cutting deck of lawnmowers. Consequently, the roller assembly is unable to float independently with respect to the cutting deck. In addition, known roller assemblies require significant effort and additional tools to attach/detach from the lawnmowers. As yet another example, known roller assemblies either are not raisable to a stowed, inoperative position or require cumbersome ropes, chains, or other attachments linked to the lawnmower to stow the roller assembly. In yet another example, known roller assemblies include spring assemblies attached between a removable part of the roller assemblies and a permanent fixture on the frame of the mowers.

In light of the foregoing, a roller assembly is desired that improves the state of the art by overcoming one or more of the aforesaid problems of the prior art.

OBJECTS AND SUMMARY OF THE INVENTION

The present invention provides an improved roller assembly for grooming lawns. The improved roller assembly includes elements that reduce attachment/detachment time without the need for additional tools, as well as enhance the functional performance of the roller assembly.

In accordance with a first aspect of the invention, one or more of the above-identified needs is met by providing a roller assembly for a lawnmower that includes a tow arm having first and second links. The first link includes a rear end that is pivotally attached to a front end of the second link, and a front end configured to be supported at least indirectly on a frame of a lawnmower. The assembly further includes a shaft supported at least indirectly coupled on the rear link. At least one roller is disposed on the shaft. A spring is disposed between the first and second links and configured to bias the second link downwardly relative to the first link thereby to bias the roller against a ground surface.

In accordance with a second aspect of the invention, the roller assembly includes a latch assembly configured to selectively hold the shaft and the roller in an inoperative position. If the tow arm is configured as described in the preceding paragraph, the latch assembly includes a second pin disposed in a second opening in the first link, the first link having a collar surrounding the second opening, the second pin biased by a spring to a retracted position, the second pin having a pair of extensions configured to be biased against the collar for holding the second pin in an extended position to hold the second link, shaft and roller in the inoperative position.

In accordance with a third aspect, the roller assembly includes a quick connect assembly having a sleeve mounted to front end portion of a tow arm. The quick connect assembly may include a pin configured for holding the sleeve on the lawnmower.

The quick connect assembly may additionally include a rod mountable to a lawnmower and configured to be received by the sleeve. Furthermore, the quick connect assembly may additionally include a mounting bracket attached to the rod, and a pair of U-bolts configured for attaching the mounting bracket and attached rod to the lawnmower.

The benefits provided by the roller assembly are particularly (but by no means exclusively) applicable to lawnmowers. Hence, in accordance with other aspects of the invention, a lawnmower having a roller assembly configured at least generally as described above and a lawnmower equipped with such a roller assembly are additionally provided.

Other objects, features, and advantages of the invention will become apparent to those skilled in the art from the following detailed description and accompanying drawings. It should be understand, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A wide variety of different roller assemblies for a variety of different applications could be constructed in accordance with the invention as defined by the claims. Hence, while preferred embodiments of the invention will now be described with reference to a commercial lawnmower towing the roller assembly, it should be understood that the invention is in no way so limited. For instance, it is also usable with a variety of a variety of different vehicles (e.g., all-terrain vehicles).

Figure 1:
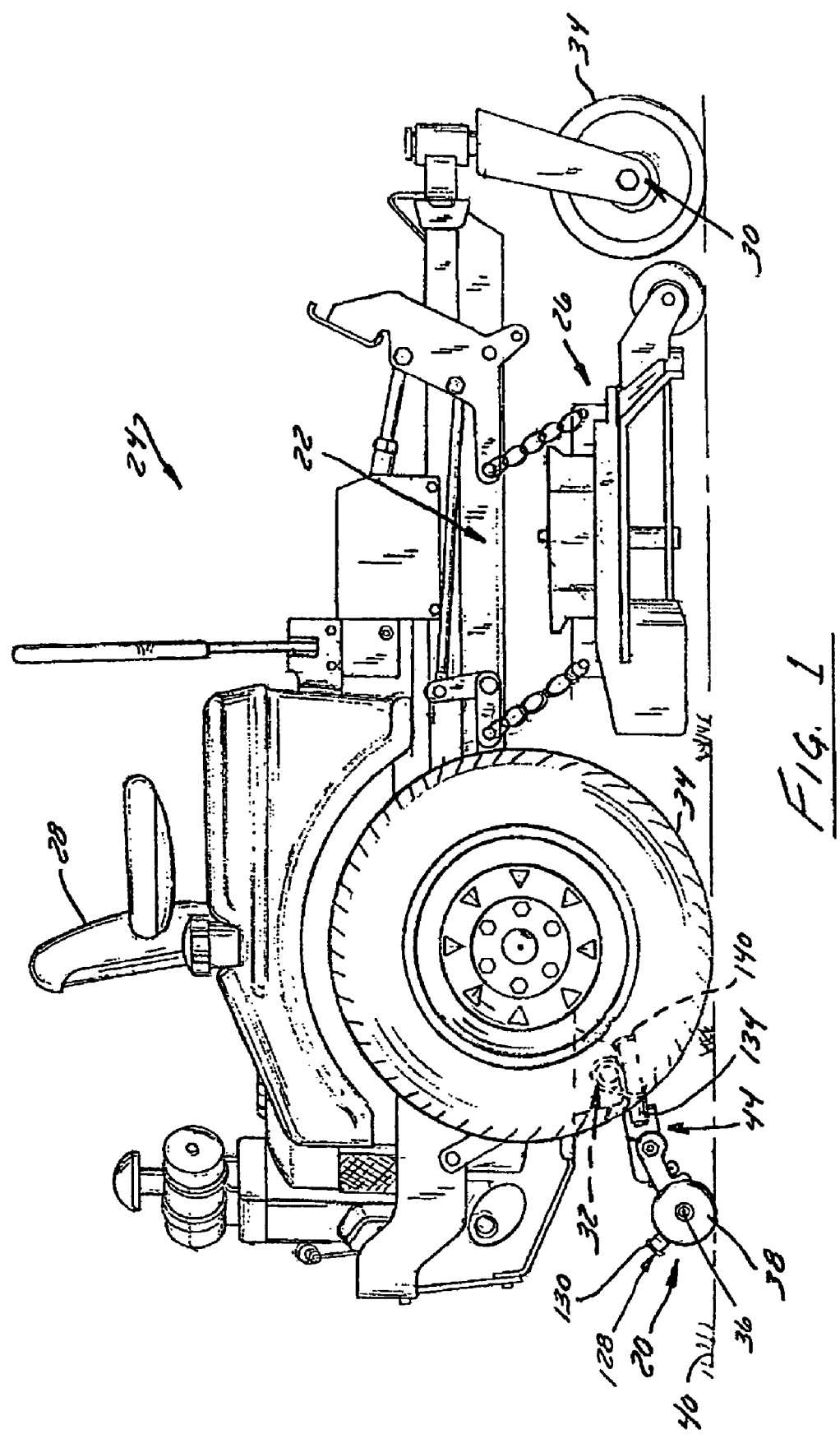
FIG. 1 is a side elevation view of a lawnmower and attached roller assembly, constructed in accordance with the present invention.
Figure 2:
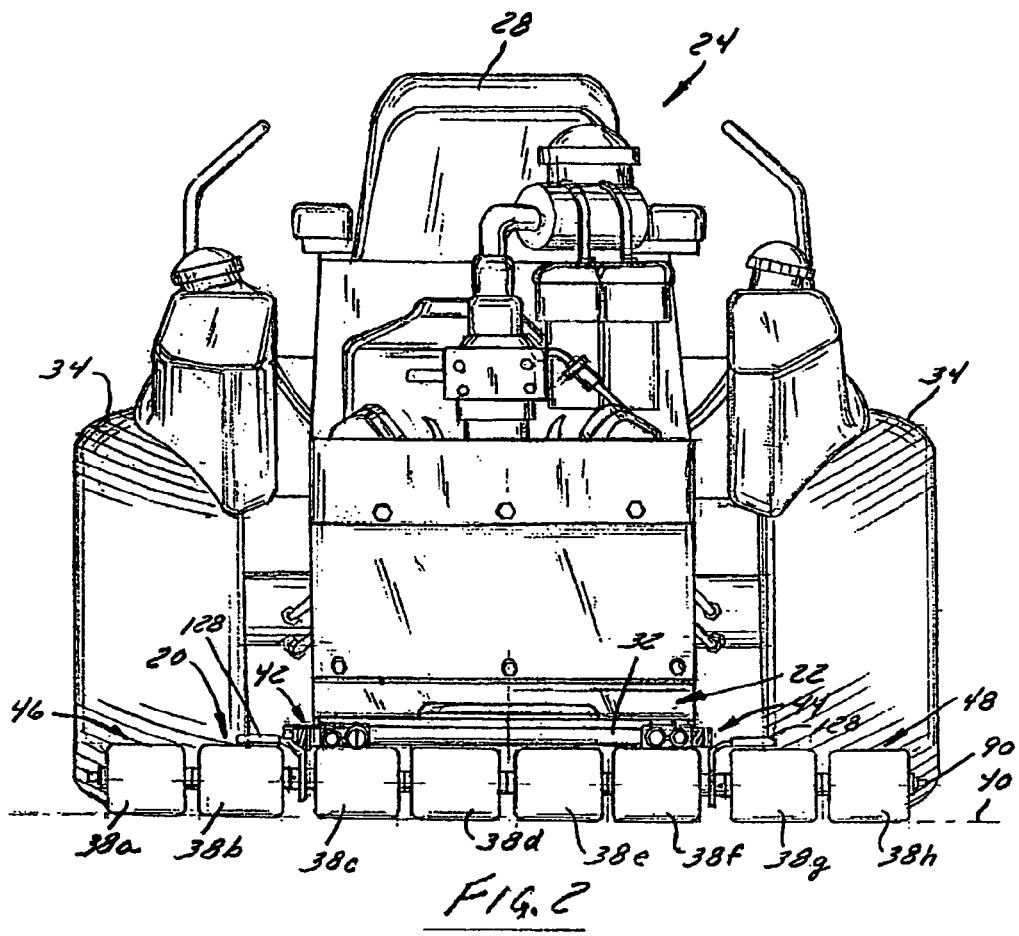
FIG. 2 is a rear elevation view of the lawnmower and roller assembly shown in FIG. 1.

Referring to FIGS. 1 and 2, a roller assembly 20 constructed in accordance with one embodiment of the present invention is shown attached to a frame 22 of a commercial lawnmower 24. The commercial lawnmower generally includes a cutting deck 26, a seat 28, and the frame 22 supports wheels 34, the frame including front 30 and a rear 32 cross bars. In general, the roller assembly 20 includes a plurality of rollers 38 configured to create a striped appearance over freshly cut grass surface 40. Of course, the use of the roller assembly 20 can vary.

Figure 3:
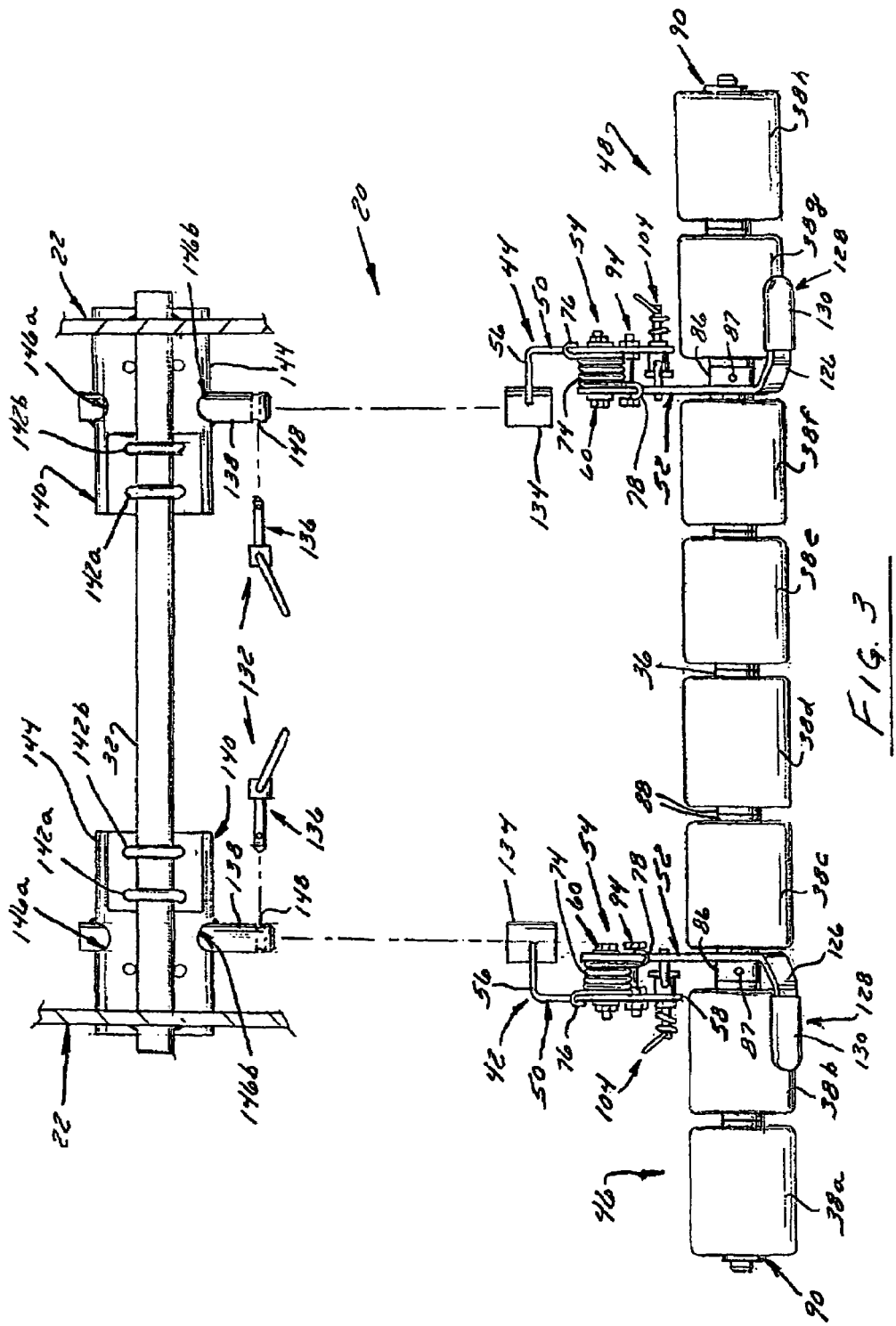
FIG. 3 is a top plan view of the roller assembly of FIGS. 1 and 2, shown detached from a cross bar of the lawnmower frame to which it is attachable.

FIG. 3 shows a plan view of the roller assembly 20 shown in FIGS. 1 and 2. The roller assembly 20 includes left 42 and right 44 tow arms that support opposite ends 46 and 48 of a shaft 36 on which the rollers 38 are rotatably mounted. The tow arms 42 and 44 articulate the roller assembly 20 from the rear cross bar 32 of the lawnmower 24. Regarding the noted drawbacks of previous known rollers, the roller assembly 20 of the present invention is supported from the frame 22 of the commercial lawnmower 24 in a rapidly attachable and detachable fashion. Furthermore, the roller assembly 20 is spring biased to contact the ground surface 40 independent from the commercial lawnmower 24. Furthermore, the roller assembly 20 can latch in a stowed position independent from the commercial lawnmower 24. The above described aspects of the disclosed embodiment of the present invention are described in detail below.

Figure 9:
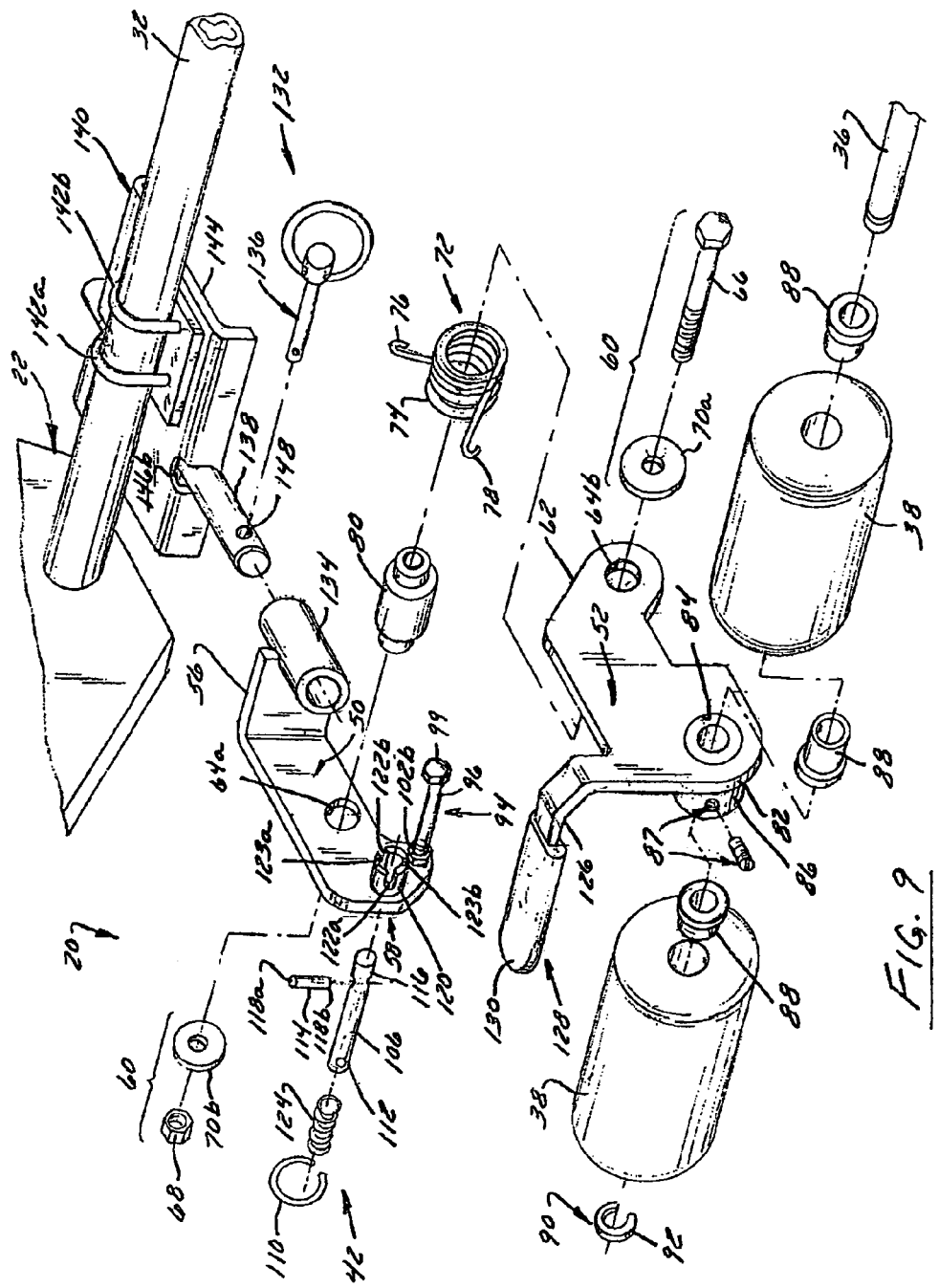
FIG. 9 is an exploded perspective view of the roller assembly of FIG. 1.

FIGS. 4-6 and 9 show detailed views of the roller assembly 20 shown in FIG. 3. Referring to FIGS. 3 and 9, the tow arms 42 and 44 are mirror images of each other. Each is articulated to facilitate stowage and spring biasing of the roller assembly 20. Each tow arm 42 and 44 includes a first link 50 pivotally hinged to a second link 52 at a hinged joint 54. The first link 50 is generally L-shaped when seen in a top plan view (see FIGS. 6 and 9) and includes a front end 56 and a rear end 58. The front end of the L-shaped first link 50 is generally configured to support the roller assembly 20 at least indirectly on the frame 22 of the lawnmower 24 in a rapidly detachable and attachable fashion as described in greater detail below. The rear end 58 of the first link 50 is pivotally attached by a pivot pin assembly 60 to a front end 62 of the second link 52. The rear end 58 of the first link 50 and the front end 62 of the second link 52 include respective bores 64a and 64b for receiving the pivot pin assembly 60. The pivot pin assembly 60 includes a threaded bolt 66, a nut 68, and a pair of washers 70a and 70b. The bolt 66 extends through the mating bores 64a and 64b to secure the pivot pin assembly 60 between the first 50 and second 52 links. The type of pivot pin assembly 60 and respective fastener can vary.

Figure 6:
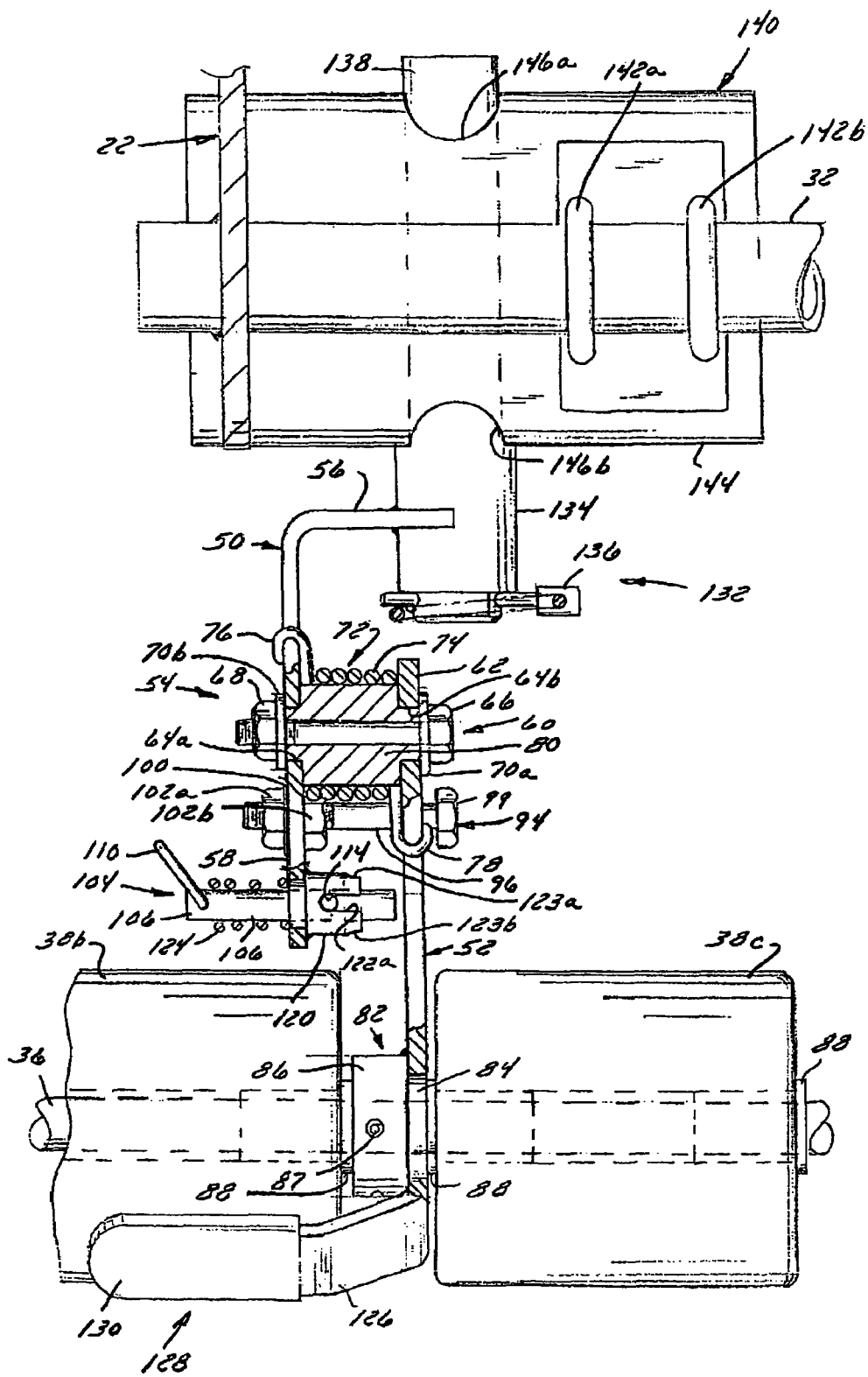
FIG. 6 is a partially cut away detail top plan view of the roller assembly of FIG. 3.

FIGS. 6 and 9 shows a detailed view of a spring 72 disposed between first 50 and second 52 links. The spring 72 is configured to bias the second link 52 in a downward direction relative to the first link 50 to bias the rollers 38 against the ground. Significantly, however, the spring 72 is wholly internal to the roller assembly 20 and, therefore, does not interfere with roller assembly 20 attachment to and detachment from the lawnmower 24. A preferred embodiment of the spring 72 is a torsion spring 74 having a first end 76 coupled to the top of the first link 50 and a second end 78 coupled to the top of the second link 52. The torsion spring 74 is sized to slide over a bushing 80 borne by the bolt 66 of the pivot pin assembly 60. Yet, the type and size of the spring 72 can vary.

Figure 5:
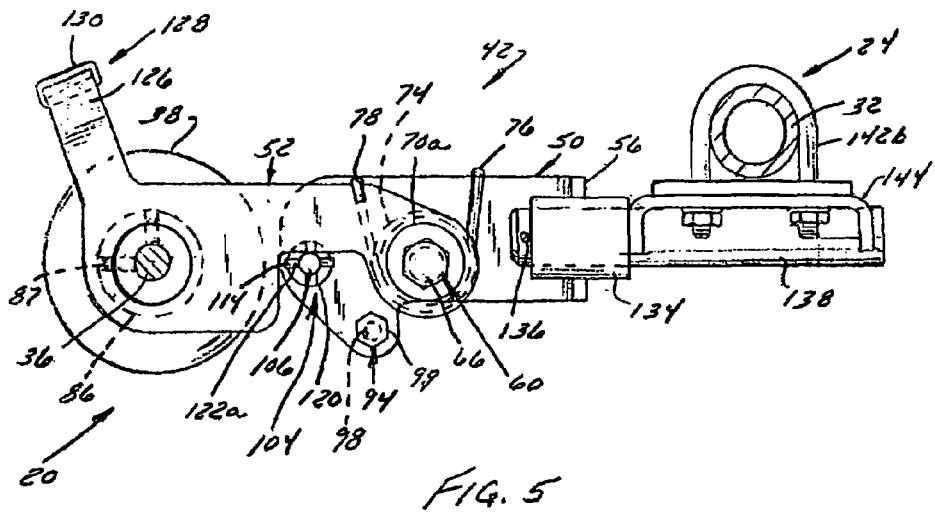
FIG. 5 is a detail side elevation view of the roller assembly of FIG. 3 in a stowed, inoperative position, thereof.
Figure 4:
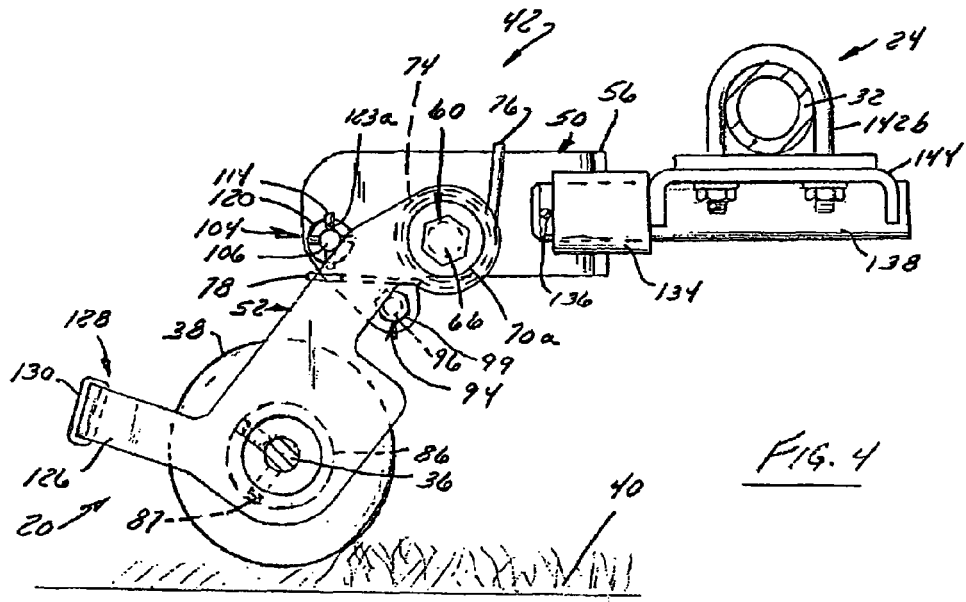
FIG. 4 is a detail side elevation view of the roller assembly of FIG. 3 in an operative position thereof.

As shown in FIGS. 4, 5, and 9, a rear end 82 of the second link 52 includes an opening 84 configured to receive the shaft 36 supporting the rollers 38. The opening 84 receives a stepped collar 86 mounted to one side of the second link 52 and configured to support the shaft 36. The collar 86 includes a tap hole to receive a set screw and a threaded rod 87 configured to secure the collar 86 to the shaft 36. The shaft 36 is a steel rod that generally extends the width of the cutting deck 26 of the commercial lawnmower 24.

As shown in FIGS. 3-6 and 9, the shaft 36 supports the plurality of rollers 38 so as to permit the rollers 38 to roll along the fresh cut grass to create the striped appearance on the grass surface 40. Eight rollers 38a-h are shown in the illustrated embodiment, and are sized and spaced to span the width of the mower 24. The rollers 38a-h are generally comprised of hard plastic or the like. Bearing sleeves 88 provide support between each roller 38a-h and the shaft 36 and set the roller-to-roller spacing along the shaft 36. Each end 46 and 48 of the shaft 36 includes a fastener 90, such as a spring clip 92 that prevents the roller 38 from sliding axially off the ends 46 and 48 of the shaft 36 while permitting the rollers 38 to rotate about the shaft 36. The composition, number, and size of the rollers 38 can vary.

Referring to FIGS. 4 and 5, the second link 52 and shaft 36 of each tow arm 42 and 44 pivot between two positions: a lowered operation position in which the rollers contact the lawn (see FIG. 4); and a raised or inoperative position at a distance above the lawn (see FIG. 5). A stop 94 limits the downward pivot motion of the second link 52 and attached shaft 36 relative to the first link 50 as the roller assembly 20 maneuvers over hills or rocks. In the illustrated embodiment, the stop 94 includes a threaded bolt 96 inserted through a stop opening 98 located in the first link 50 behind the pivot pin assembly 60. The bolt 96 is sufficiently long to permit a head 99 to extend laterally beyond the second link 52, hence permitting the top of the bolts' shank to act as an abutment surface for the bottom of the second link 52, as seen in FIG. 6. The bolt 96 is attached to the first link 50 by a washer 100 and a pair of nuts 102a and 102b (FIG. 9) that flank the first link 50. The type of stop 94 and its location can vary.

Figure 7:
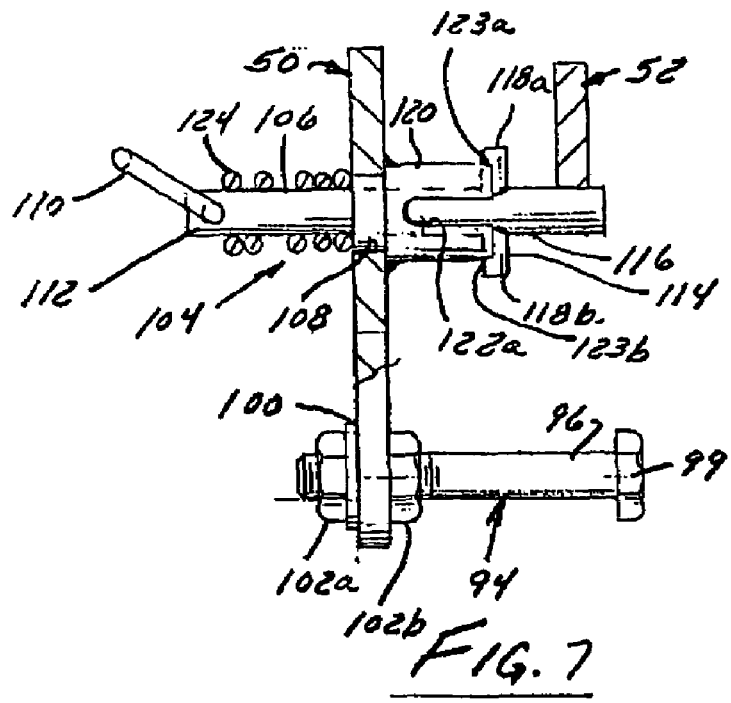
FIG. 7 is a detail sectional end elevation view of a latch assembly of the roller assembly, showing the latch assembly in an extended, engaged position thereof.
Figure 8:
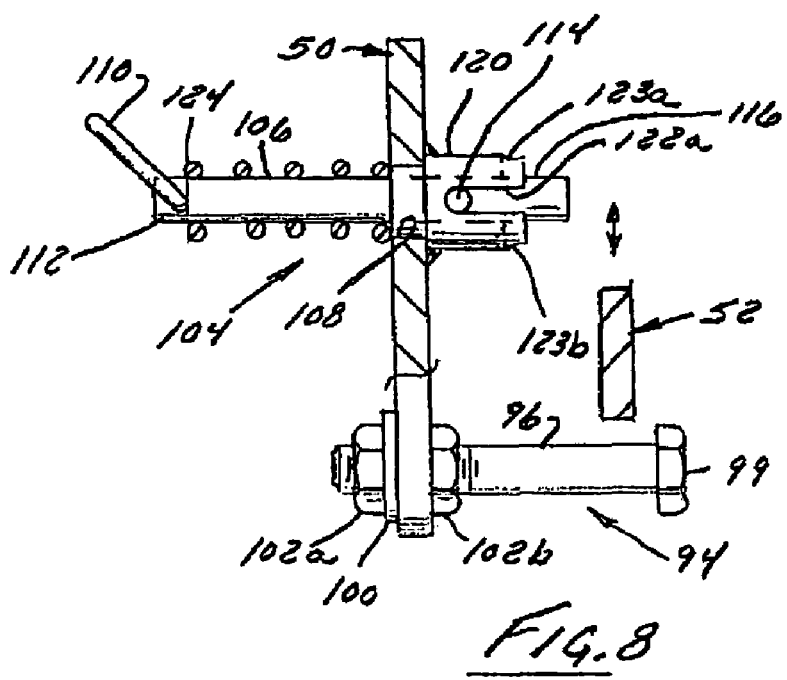
FIG. 8 is a detail sectional end elevation view of the latch assembly, showing the latch assembly in a retracted, disengaged position thereof.

Referring to FIGS. 4-8, each tow arm 42 and 44 of the roller assembly 20 includes a latch assembly 104 configured to be selectively engageable to hold the roller assembly 20 in the raised or inoperative position above the grass surface 40 in a manner that does not interfere with attachment and detachment of the roller assembly 20 to and from the lawnmower frame 22. Referring to FIGS. 7 and 8, one embodiment of the latch assembly 104 includes a spring biased latch pin 106 configured to selectively support the second link 52, shaft 36, and rollers 38 in the raised position. The latch pin 106 extends through a bore in collar 120 located above and behind the stop 94 in the first link 50. The latch pin 106 has a ring 110 attached thereto at one end 112 and a cross pin 114 inserted radially therethrough at the opposite end 116. The ends 118a and 118b of the cross pin 114 extend radially outward from opposite sides of the latch pin 106. A collar 120 extends around the latch pin 106 mounting bore 108 in the first link 50. The collar 120 includes a first, relatively deep pair of slots 122a and 122b in its inner axial end that receive the ends 118a and 118b of the cross pin 114 when the latch pin 106 is in a retracted position thereof, as seen in FIGS. 4, 6, and 8. A second, relatively shallow pair of slots, 123a, 123b spaced 90° from the slots 122a and 122b, is also formed in the inner axial end of the collar 120 for receiving the ends 118a and 118b of the cross pin 114 to prevent unintended rotation of the latch pin 106 relative to the collar 120 when the latch pin 106 is in the extended position of FIG. 7. A spring 124 is disposed to bias the latch pin 106 toward its retracted position. In the retracted position, the ends 118a and 118b of the cross pin 114 are seated against the inner ends of the slots 122a and 122b. When the latch pin 106 is driven manually from the retracted position of FIGS. 4, 6 and 8, to the extended position of FIGS. 5 and 7, the ends 118a and 118b of the cross pin 114 travel beyond the slots 122a and 122b in the collar 120. Upon rotation and subsequent partial rotation and release of the latch pin 106, the ends 118a and 118b are biased by the spring 124 into the slots 123a and 123b the collar 120 as seen in FIG. 7. The cross pin 114 thereafter is configured to hold the latch pin 106 in an extended position in which the latch pin 106 extends underneath the second link 52 to hold the second link 52 in the raised position, as seen in FIGS. 5 and 7. Upon driving the cross pin 114 from the slots 123a and 123b and rotating the latch pin 106 to re-align the ends 118a and 118b with the slots 122a and 122b, the spring 124 automatically drives the latch pin 106 to the retracted position and out from support underneath the second link 52 and attached shaft 36 of rollers 38.

Significantly, the latch assembly 104 described above is fully integrated on the roller assembly 20 and does not require attaching elements to the lawnmower 24.

Referring to FIGS. 6 and 9, each tow arm 42 and 44 of the roller assembly 20 further includes a handle 126 configured to allow one to raise the second link 52 and shaft 36 to their raised position. In the illustrated embodiment the handle 126 is located at the rear end 82 of the second link 52. A preferred handle 126 may be formed integrally with the second link 52. The handle 126 is bent in a lateral direction parallel with the shaft 36 of rollers 38. A free end 128 of the handle 126 bears a sheath 130 to enhance the grip of the handle 126.

Referring to FIGS. 3-6 and 9, the roller assembly 20 includes a quick connect assembly 132 for mounting the roller assembly 20 on the lawnmower frame 22. The quick connect assembly 132 is configured to reduce the time to attach/detach the roller assembly 20 with the lawnmower 24. Referring to FIGS. 3 and 9, the quick connect assembly 132 of each tow arm 42 and 44 includes a sleeve 134 and a hitch pin 136 configured to hold the sleeve 134 on the lawnmower's frame 22. The sleeve 134 is mounted on the front end of the first link 50 of each tow arm 42 and 44. In the illustrated embodiment, the sleeve 134 is configured to receive a rod 138 mounted on the rear cross frame 32 of the frame 22. In contrast, previous known roller assemblies typically mount to the cutting deck 26 of the lawnmower 24. Hence, the quick connect assembly 132 of the present invention is configured to allow the roller assembly 20 to float independently of the cutting deck 26.

The quick connect assembly 132 associated with each tow arm 42 and 44 further includes a mounting bracket 140 and a pair of U-bolts 142a and 142b configured to mount the rod 138 to the cross frame 32 (FIGS. 3-6 and 9). The mounting bracket 140 includes a c-channel steel plate 144 having a pair of openings 146a and 146b to receive the rod 138. The rod 138 is comprised of solid steel and welded to the mounting bracket 140. The U-bolts 142a and 142b mount the rod 138 and bracket 140 to the rear cross frame 32 of the lawnmower frame 22. Yet, the location and the type of attachment to mount the rod 138 can vary. The rod 138 further includes an opening 148 disposed behind the sleeve 134 to receive the hitch pin 136 for holding the sleeve 134 on the rod 138. The hitch pin 136 is configured to release the roller assembly 20 from the lawnmower 24 without using any tools. The roller assembly 20 can be released from the lawnmower 24 by removing the hitch pin 136 and sliding the sleeve 134 off of the rod 138.

Alternatively, the rod 138 can be mounted on the front end 56 of the first link 50 of each tow arm 42 and 44 and received by a sleeve 134 mounted on the frame 22 of the lawnmower 24.

Having described the basic architecture of the roller assembly 20 of the present invention, the following is a description of the operation of the roller assembly 20. It is envisioned that the operation of the roller assembly 20 can be modified for other embodiments of the roller assembly 20. Furthermore, it is envisioned that not all the acts may be required, that some of the acts may be modified, or that the order of the acts may vary.

Figure 10:
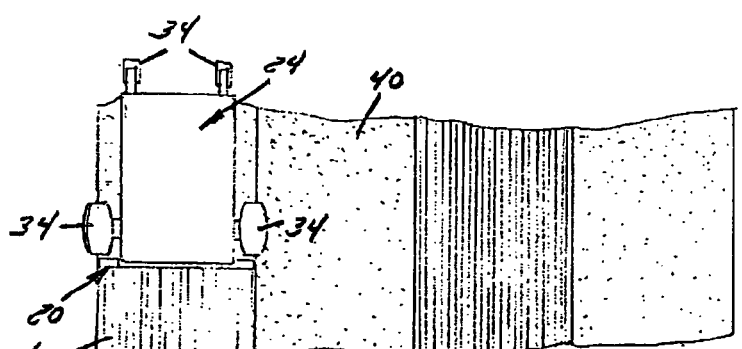
FIG. 10 is an elevation view illustrating the striping of a lawn using the roller assembly of FIGS. 2-9.

Initially, an operator mounts the roller assembly 20 on the commercial lawnmower 24. With the quick assembly 132, the operator can rapidly attach the roller assembly 20 by sliding the sleeve 134 over the rod 138 mounted to the rear cross frame 32 of the mower 24 and inserting the hitch pin 136 in the opening behind the sleeve 134. Next, assuming the roller assembly 20 is in its raised or stowed position, the operator will unlatch the roller assembly 20 from its stowed position, if necessary. Specifically, while using the handle 126 to raise the roller assembly 20, the operator rotates the latch pin 106 such that ends 118a and 118b of the cross pin 114 align with and retract into the slots 122a and 122b, whereupon the spring 124 drives the latch pin from the extended position of FIG. 7 to the retracted position of FIG. 8. The spring 74 then biases the shaft rollers 38 into contact with the ground surface 40. The operator can then proceed to cut and/or stripe the lawn 40. The rollers 38 on the roller assembly 20 are sized and aligned to stripe the lawn as illustrated in FIG. 10. Upon completion of striping the lawn 40, the operator can return the roller assembly 20 to the stowed position by raising the shaft 36 of rollers 38 with the handle 126 to the raised position, then returning the latch pin 106 to the position of FIGS. 2 and 7. When the operator releases the handle 126, the latch pin 106 holds the second link 52 and shaft 36 of rollers 38 in the raised, stowed position. The operator can furthermore rapidly detach the roller assembly 20 from the commercial lawnmower 24 by removing the hitch pins 136 and sliding the sleeves 134 from the rods 138.

As indicated above, many changes and modifications may be made to the present invention without departing from the spirit thereof. The scope of some of these changes is discussed above. The scope of others will become apparent from the appended claims.

We claim:

1. A roller assembly for attachment to a lawnmower, comprising:
    (A) a tow arm having a front link with a rear end pivotally attached to a front end of a rear link, and a front end of the front link configured to be at least indirectly supported by a lawnmower frame independently of a cutting deck of the lawnmower;
    (B) a shaft supported at least indirectly by a rear end of the rear link of the tow arm; and
    (C) a plurality of rollers rotatably borne by the shaft and configured to roll along a ground surface; and
    (D) a latch assembly that is selectively engageable to hold the tow arm in a position that holds the roller assembly in a raised, inoperative position in which the rollers are incapable of riding along a ground surface, wherein the latch assembly includes a pin which is selectively movable between
   i. a first position in which the latch assembly is disengaged to permit the roller assembly to drop to a lowered, operative position in which the rollers are capable of riding along the ground surface, and
   ii. a second position in which the latch assembly is engaged and the roller assembly is held in the raised, inoperative position thereof.

2. The roller assembly of claim 1, wherein the pin is a latch pin that is biased by a spring to the retracted position thereof.

3. The roller assembly as recited in claim 2, further comprising a collar that is mounted on the front link in alignment with the latch pin and through which the latch pin extends, and further comprising a cross pin that extends radially from the latch pin and that is configured to selectively rest against an axial surface of the collar to hold the latch pin in the extended position thereof.

4. The roller assembly as recited in claim 3, wherein a slot is formed in an axial end of the collar and the cross pin is seated in the slot when the latch pin is in the retracted position thereof and extended out of the slot when the latch pin is in the extended position thereof.

5. The lawn striper assembly as recited in claim 1, wherein the pin extends horizontally and transversely to the tow arm.

6. A lawnmower, comprising:
   (A) a motorized drive assembly;
   (B) a cutter assembly that is housed by a cutter deck and that is driven by the motorized drive assembly;
   (C) a plurality of wheels;
   (D) a frame that supports of the motorized drive assembly and the cutter deck; and
   (E) a roller assembly having e
      a tow arm having a front and rear links, the front link having a front end attached to the lawnmower frame independently of the cutter deck and having a rear end pivotally attached to a front end of the rear link,
      a shaft supported at least indirectly by a rear end of the rear link of the tow arm, and
      a plurality of rollers borne by the shaft and rollable along a ground surface; and
      a latch assembly that is configured to be selectively engageable to hold the tow arm in a position that holds the roller assembly in a raised, inoperative position in which the rollers are incapable of riding along a ground surface, wherein the latch assembly includes a pin which is selectively movable between
         i. a first position in which the latch assembly is disengaged to permit the roller assembly to drop to a lowered, operative position in which the rollers are capable of riding along the ground surface, and
         ii. a second position in which the latch assembly is engaged and the roller assembly is held in the raised, inoperative position thereof.

7. The lawnmower as recited in claim 6, wherein the latch assembly includes a latch pin that assumes a retracted position when the latch assembly is disengaged and an extended position when the latch assembly is engaged, and further comprising a cross pin which is mounted on the latch pin and which is capable, depending on a rotational position of the latch pin, of either preventing movement of the latch pin into the retracted position thereof from the extended position thereof or permitting said movement.

8. The lawnmower as recited in claim 6, wherein the pin extends horizontally and transversely to the tow arm.

* * * * *